United States Patent [19]
Rao et al.

[11] Patent Number: 4,695,519
[45] Date of Patent: Sep. 22, 1987

[54] ELECTROCHEMICAL CELL CONSTRUCTION AND FILL METHOD

[75] Inventors: T. V. Rao, Coon Rapids; Robert C. Samec, St. Paul, both of Minn.

[73] Assignee: Medtronic, Inc., Minneapolis, Minn.

[21] Appl. No.: 507,044

[22] Filed: Jun. 23, 1983

Related U.S. Application Data

[63] Continuation of Ser. No. 264,789, May 18, 1981, abandoned.

[51] Int. Cl.[4] .................. H07M 10/44; B65B 1/20
[52] U.S. Cl. ............................... 429/52; 429/72; 429/122; 141/13; 141/32; 141/82; 141/11
[58] Field of Search .................. 141/13, 31, 82, 192, 141/11; 429/72, 50, 52, 121-122

[56] References Cited

U.S. PATENT DOCUMENTS

| | | | |
|---|---|---|---|
| 3,475,226 | 10/1969 | Fraioli | 429/72 |
| 3,640,318 | 2/1972 | Shmueli et al. | 141/11 |
| 3,945,846 | 3/1976 | Dey | 429/72 X |
| 4,006,281 | 2/1977 | Markin et al. | 429/103 |
| 4,142,561 | 3/1979 | Bennett et al. | 141/82 |

Primary Examiner—Brian E. Hearn
Assistant Examiner—Stephen J. Kalafut
Attorney, Agent, or Firm—Vidas & Arrett

[57] ABSTRACT

A method of filling an electrochemical cell container having a penetrable, self-sealing septum.

5 Claims, 4 Drawing Figures

ELECTROCHEMICAL CELL CONSTRUCTION AND FILL METHOD

This is a continuation of application Ser. No. 264,789 filed May 18, 1981, abandoned.

DESCRIPTION

Background of Prior Art

This invention relates to the fabrication of electrochemical cells. Specifically it is concerned with a method of introducing fluid components into cells of the type having a penetrable, self-sealing septum in the filler opening of the cell container. For purposes of this invention the term "fluid" is meant to describe any component capable of flowing into the cell container. In most instances, the component will be a liquid.

The following listed U.S. Patents show various lithium-halogen batteries or cells making use of cell containers in which a fluid component is introduced into the container through a filler opening: 4,105,833; 4,135,519; 4,132,836; 4,166,887 and 4,211,832. All of these patents are incorporated herein by reference.

Other electrochemical cells incorporating different components, may make use of the invention. It should be understood, for purposes of this invention, that the fluid component used need be in fluid form only at the time of its introduction into the cell container. Thereafter, it may solidify or assume any other form as required by the particular cell involved.

BRIEF SUMMARY OF THE INVENTION

This invention provides an improvement in electrochemical cell fabrication wherein a fluid component is introduced into a cell container filler opening through a penetrable, self-sealing septum.

In terms of the preferred method, the invention comprises the steps: sealing the filler opening in the cell container with a penetrable self-sealing septum, penetrating the septum with a hypodermic-like needle, evacuating the container by drawing the vacuum through the needle, and introducing a fluid cell component through the septum by means of the same needle or a second needle. The evacuated container draws the fluid component into the container.

The container need not be evacuated. If a relief opening is provided in the container, the fluid component may be introduced directly into the container through a needle inserted through the septum.

DETAILED DESCRIPTION OF THE INVENTION

Figure 1:
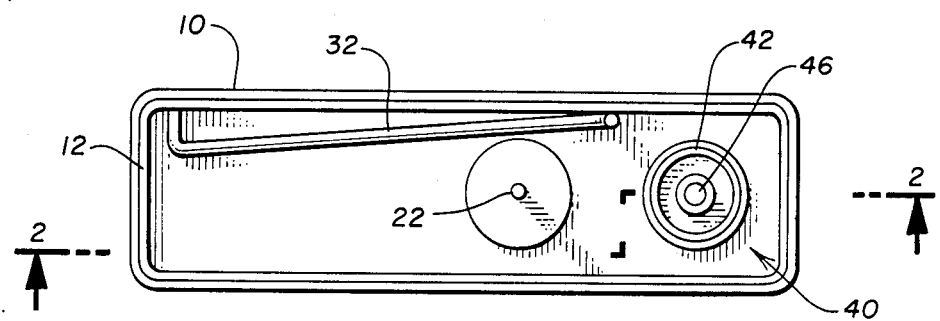
FIG. 1 is a top elevational view of an electrochemical cell illustrating the improved construction of the invention.

Referring now to the Figures, a hermetically sealed lithium-halogen cell is illustrated showing a preferred application of the invention. The cell comprises a container 10 of metal such as stainless steel. Container 10 has an open top or end which is closed by means of a lid 12, also of stainless steel, which is welded to container 10. The cell further includes anode means comprising a lithium element 14 having an embedded anode current collector element 18. Current collector 18 is a relatively thin element of nickel or zirconium. A conductor lead feedthrough assembly 20 including lead 22 of stainless steel or other suitable metal is spot welded to collector element 18. Electrical lead 22 is of sufficient length to extend out of the container 10 for making an external electrical connection thereto. Conductor 22 is sealed from the remainder of the cell contents by means including an insulator element generally designated 24 which surrounds lead 22. Insulator 24 is of a material which in addition to being a non-conductor of electricity is also non-reactive with the contents of the cell, such as the halogen cathode materials utilized in the cell illustrated. One form of material found to perform satisfactorily are the fluoropolymers, such as the one available under the Tradename "Halar", a trademark of the Allied Chemical Company. Other non-reactive materials may be used for insulator 24.

The anode assembly comprising the lithium element 14, for example, and current collector 18 is preferably fitted within an anode holding or retention means comprised of a peripheral frame member in the form of a band 30 which peripherally encloses the anode assembly leaving the major lateral surface areas of the lithium element exposed. Band 30 is preferably of the aforementioned fluoropolymer material or any similar material which is non-reactive with the cell contents. In the present illustration, lithium element 14 is of a sandwich-like construction in which two pieces are brought together with collector 18 therebetween. Band 30 surrounds the peripheral edge of lithium element 14 engaging the peripheral contact surfaces provided at the joint area formed between the lithium pieces. The opposite ends of band 30 are provided with apertures of a size sufficient to receive a portion of insulator 24. These ends are overlapped adjacent the insulator as shown in FIG. 2 to provide a wrap-around structure.

Figure 2:
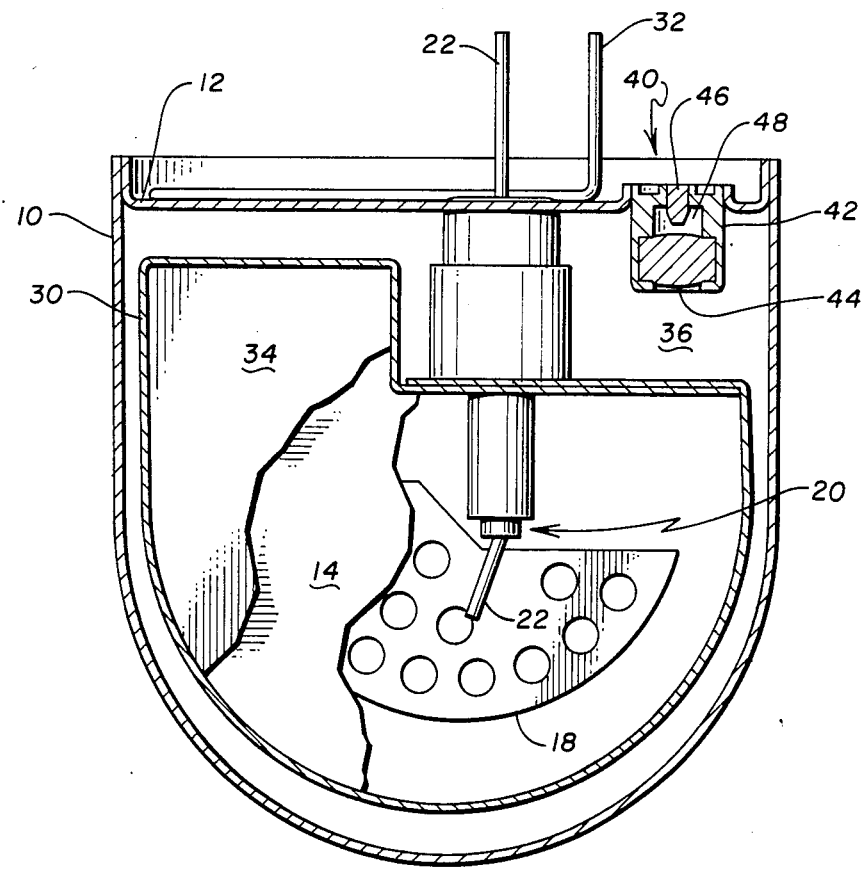
FIG. 2 is a side elevational view in section along line 2—2 of FIG. 1 with parts removed illustrating the invention in more detail.

The anode assembly may be provided with an organic coating 34 as is known in the art and then positioned in container 10 as shown in FIG. 2 with the lateral anode operative surfaces spaced from the inner surface of the container. Lid 12 is then welded to cotainer 10.

In the particular embodiment illustrated container 10, being of elctrically conducting material, serves as a cathode current collector in direct contact with the cathodic contents of container 10. Consequently, an electrical lead 32 may be attached directly to container 10 for cathodic contact.

In the prior art, a halogen cathode material 36 such as iodine or bromine contained in an organic component material, as is also known in the art, was poured through a suitable filler opening in lid 12 to fill container 10 and operatively contact the exposed surfaces of the lithium anode. For example, a common cathode material is prepared by heating a poly(vinylpyridine) organic material, such as poly (vinylpyridine), mixed with iodine, to a temperature greater than the crystallization temperature of iodine for example about 300° F. Consequently, the mixture becomes fluid. The amount of iodine is ordinarily greater than about 50% by weight of the resulting mixture. The resulting mixture upon heating was poured into container 10 to substantially fill it. The amount of material introduced into the container is preferably sufficient to contact the lateral surfaces of lithium element 14 and to reach a level at or adjacent the interior surface of lid 12. The opening in lid 12 was then hermetically sealed with a series of plugs such as an inner Teflon plug and an outer stainless steel plug or plugs (not shown).

For purposes of the present invention the foregoing filler arrangement and plug construction is modified by means of the improved sealing subassembly generally indicated at 40. Subassembly 40 includes a metal sleeve 42 of stainless steel or the like which includes a penetrable self-sealing septum 44, preferably at an inner location as shown in FIG. 2. Sleeve 42 is welded into an opening in lid 12 as shown. Self-sealing septum 44 may be molded into sleeve 42 or it may be preformed and seated in the sleeve by forming the sleeve around septum 44 as shown. Any other means suitable for sealing the septum in the sleeve may be used. Self-sealing septums and the materials therefor are known. They are made of a flexible, resilient body of a suitable material such as rubber which seals itself when punctured. Typically, a silicone rubber, a fluoro-silicone rubber or fluoro-carbon rubber may be used. The latter is available under the tradename Viton, a trademark of DuPont. A thickness on the order of 0.080 inches is satisfactory although this is not critical so long as sealing is assured. Thus, thickness may vary over a wide range.

With such a septum in place as shown in the drawing, a hypodermic-like needle may be inserted through septum 44 by means of which container 10 may be evacuated and then filled with any fluid component or components of the cell, such as the aforementioned cathode material 36.

More specifically, after sealing the filler opening with the self-sealing septum, the septum may be penetrated with first and second hypodermic-like needles. Container 10 may be evacuated by drawing a vacuum through the first needle and filled by introducing the fluid component through the second needle as the vacuum is drawn through the first needle or after the container has been evacuated.

In the case of a fluid component of the type described above i.e., a halogen/organic material, it must be melted by heating to achieve a fluid state.

For such a material it is convenient to heat the needle to the melting temperature of the halogen/organic material i.e., about 285° to 300° F. material through which it flows. Flow may be halted automatically when the container is filled because the evacuated container is full of the fluid component. The component then solidifies in the container.

When it is desired that flow through the needle stop, the needle which is used to deliver the component into the container is allowed to cool down sufficiently to solidify the fluid component inside the needle. This prevents the septum material from plugging the hole in the needle during entry through the septum as well as minimizing or eliminating fumes. Solidification in the needle also helps prevent voids in the container since there is no air present in the needle at any time. The only time the component material in the needle is fluid is when the needle is heated. The flow of the component prevents the needle from being plugged by solidification even after the source of heat is removed. When the container becomes full and flow ceases, the material in the needle is allowed to solidify and the needle may be withdrawn without contamination to the closing area or the surrounding environment.

A #22 hypodermic needle has been found satisfactory for use with this invention. One such needle may be connected to a vacuum pump capable of drawing a vacuum on the order of about $10^{-4}$ microns. The needle may be withdrawn from the septum in which case the septum self-seals. Another needle, a #18 is preferred in the case of the iodine/organic material, may be connected to a source of fluid cell component. Upon introduction of this needle through the septum and heating the needle, the vacuum in the container draws the fluid component until the container is full without voids.

Figure 3:
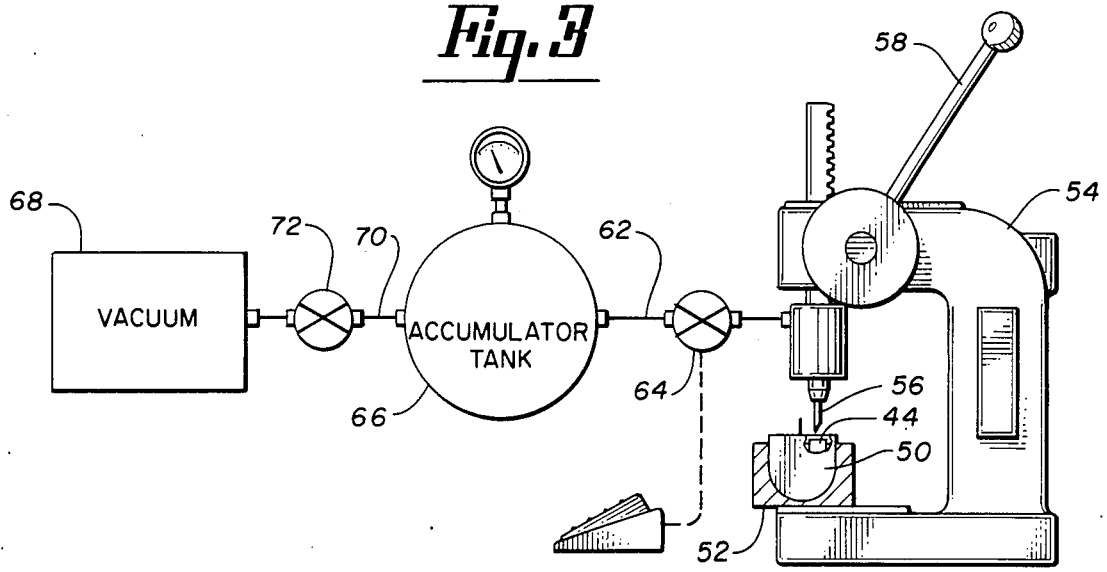
FIG. 3 is a schematic showing of an evacuation work station.
Figure 4:
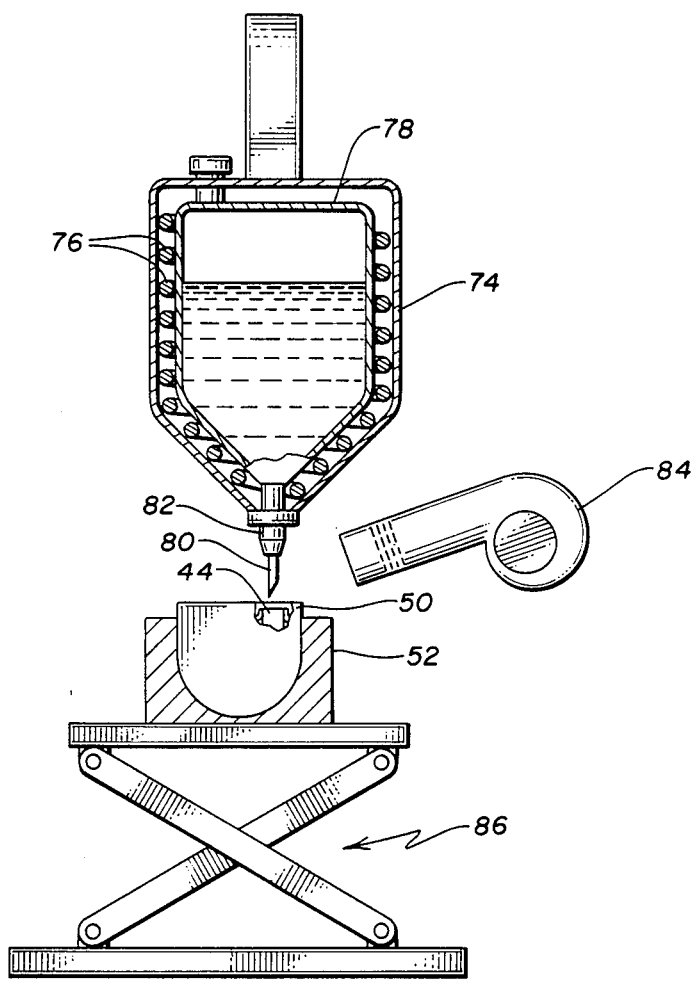
FIG. 4 is a schematic showing of a fill work station.

Apparatus for performing the filling method is shown in FIGS. 3 and 4 schematically. FIG. 3 shows a battery 50 held in a fixture 52 which is mounted in an apparatus 54. Apparatus 54 carries a hypodermic needle 56 which may be lowered by means of handle 58 to penetrate septum 44 in the battery. Needle 56 is carried by housing 60 which is connected to a vacuum line 62. Vacuum line 62 contains a valve 64, preferably foot operated by means of which vacuum may be applied through needle 56 to battery 50 after septum 44 has been penetrated. Line 62 connects to an accumulator tank 66 and is in turn connected to vacuum pump 68 by vacuum line 70. A manual valve 72 may be included in line 70.

As is apparent, the vacuum system may be readily used to evacuate battery 50. When needle 56 is withdrawn, septum 44 self-seals and the evacuated battery 50 is ready to be filled.

Battery 50 in fixture 52 is then transferred to the filling work station shown in FIG. 4. The station comprises a container 74 for holding the fluid component to be introduced into battery 50. In this instance, since the component is an iodine/polyvinylpyridine mixture which must be heated, container 74 will include an internal electrical heating element 76 within which a glass container 78 is held. The iodine/organic is contained in glass container 78 in a molten condition. A hypodermic-like needle 80 is connected to the bottom of the container through which the material may flow, when it is being dispensed. Since needle 80 is removed from heating element 76, its normal ambient temperature will be low enough to allow any of the fluid being dispensed to solidify, thus stopping the flow of material from the container. If the fluid component being dispensed is a fluid at ambient temperatures then a valve would be included in the housing 82 to control flow.

In the arrangement shown, an electrically operated hot air blower 84 is preferably used to heat needle 80 when flow is desired. The blower is turned off, allowing the needle to cool and the fluid component to solidify in the needle when it is desired to terminate flow. Other sources of heat may be used for this purpose.

As shown, fixture 52 is carried by an adjustable platform generally designated at 86 by means of which battery 50 may be raised to needle 80 for penetration of septum 44 and filling of the battery. When full and flow has been stopped, battery 50 is lowered by the adjustable platform withdrawing needle 80 from the septum.

Following the filling of battery 50 by means of penetration of the self-sealing septum 44, metal plug 46 is inserted into sleeve 42 and preferably welded into position. As can be seen, an antechamber or cavity 48 exists between plug 46 and septum 44.

Antechamber 48 is used as a void volume for helium to check the hermeticity of the weld between sleeve 42 and metal plug 46.

While the preferred embodiment has been described in detail, this has not been done for purposes of limitation but by way of illustration. The invention is intended to be defined by the following claims.

We claim:

1. The method of introducing a fluid component into an electrochemical cell having a filler opening in the cell container plugged with a penetrable self-sealing septum, and in which the fluid component is of the type which is solid at ambient temperature and which must be heated to a melting point to achieve the fluid condition, comprising:

penetrating the septum with a hypodermic-like needle, introducing the heated fluid component into the container by flow through the needle, heating the needle to prevent uncontrolled solidification of the fluid component therein and flow stoppage, and cooling the needle to stop fluid flow therethrough by solidification of the fluid component as desired.

2. The method of claim 1 wherein the container is evacuated prior to introduction of the fluid component.

3. The method of claim 2 wherein another needle is used to penetrate the septum and evacuate the container.

4. The method of claim 3 wherein the needle used to introduce the fluid component is heated at least intermittently.

5. The method of claim 4 wherein the fluid component is a heated mixture of iodine and polyvinylpyridine.

* * * * *